United States Patent [19]

Miyajima

[11] Patent Number: 5,070,133
[45] Date of Patent: Dec. 3, 1991

[54] HIGH WATER-ABSORPTIVE RESIN EMULSION

[75] Inventor: Tooru Miyajima, Ebina, Japan

[73] Assignee: Kyoritsu Yuki Co., Ltd., Tokyo, Japan

[21] Appl. No.: 541,098

[22] Filed: Jun. 20, 1990

Related U.S. Application Data

[63] Continuation of Ser. No. 68,892, Jun. 30, 1987, abandoned.

[51] Int. Cl.$^5$ ............................................... C08J 3/02
[52] U.S. Cl. .................................. 524/501; 524/547; 524/555
[58] Field of Search ........................ 524/555, 501, 547

[56] References Cited

U.S. PATENT DOCUMENTS

| | | | |
|---|---|---|---|
| 4,301,240 | 11/1981 | Bruck et al. | 430/537 |
| 4,379,883 | 4/1983 | Zecher | 524/801 |
| 4,654,393 | 3/1987 | Mikata et al. | 524/555 |
| 4,677,152 | 6/1987 | Allen et al. | 524/555 |
| 4,686,254 | 8/1987 | Lochhead et al. | 524/555 |
| 4,732,930 | 3/1988 | Tanaka et al. | 524/555 |
| 4,737,541 | 4/1988 | Stavenger et al. | 524/555 |
| 4,740,319 | 4/1988 | Patel et al. | 524/555 |
| 4,742,086 | 5/1988 | Masamizu et al. | 524/555 |
| 4,760,110 | 7/1988 | Das | 524/555 |
| 4,771,094 | 9/1988 | Romberger | 524/555 |
| 4,794,139 | 12/1988 | Braden et al. | 524/555 |

Primary Examiner—Joseph L. Schofer
Assistant Examiner—J. M. Reddick
Attorney, Agent, or Firm—Weingarten, Schurgin, Gagnebin & Hayes

[57] ABSTRACT

The present invention relates to a high water-absorptive resin emulsion in which fine particles of an ionic resin having a low crosslinking density are dispersed in an oil, and the above emulsion can be prepared by a reversed phase emulsion polymerization of ionic water-soluble monomers in the oil.

7 Claims, No Drawings

HIGH WATER-ABSORPTIVE RESIN EMULSION

This application is a continuation of application Ser. No. 07/068,892, filed June 30, 1987 now abandoned.

BACKGROUND OF THE INVENTION (1) Field of the Invention

The present invention relates to a high water-absorptive resin emulsion in which high water-absorptive resin fine particles each having a diameter of 3 $\mu$m or less are dispersed in an oil. Such a high water-absorptive resin emulsion can be prepared by a reversed phase emulsion polymerization of an ionic water-soluble monomer and a divinyl compound in an oil, and it can be utilized as an aromatic agent, a sealing material, a dew condensation inhibitor, a spreading agent for agricultural chemicals, and a cosmetic material.

(2) Description of the Prior Art

Heretofore, crosslinking polymers having ionic groups have been known as high water-absorptive resins. The most usual high water-absorptive resin is a crosslinked polyacrylate, and other resins of such a type include a cationic high water-absorptive resin disclosed in Japanese Patent Provisional Publication No. 154709/1983 and an amphoteric high water-absorptive resin in Japanese Patent Provisional Publication No. 154710/1983.

These conventional known high water-absorptive resins are in the form of particles each having a diameter of 100 $\mu$m or more. Such powdery high water-absorptive resins are poor in workability, because they tend to raise a dust, are liable to condense owing to their high hygroscopicity, and are inconvenient for pipe transportation and metering due to not being a liquid.

These problems can be solved by providing a high water-absorptive resin emulsion in which high water-absorptive resin fine particles are dispersed in an oil, but such an emulsion has not been known before the filing of the present invention. The above high water-absorptive resin emulsion can be obtained by a reversed phase emulsion polymerization of a water-soluble monomer having an ionic group and a divinyl compound with an oil-soluble radical-generator. As a technique which is similar to the reversed phase emulsion polymerization, there is a reversed phase suspension polymerization. In the latter, a water-soluble radical-generator is used, and thus a polymerization will take place in an aqueous phase containing monomer, with the result that polymer particles each having relatively large diameters will be formed.

On the contrary, in the above mentioned reversed phase emulsion polymerization, the oil-soluble radical-generator is used, and in consequence the polymerization will occur in a micell, so that fine particles will be obtained.

The method for preparing the water-soluble polymer through the reversed phase emulsion polymerization is known, and its fundamental patent is U.S. Pat. No. 3284393. However, the polymer prepared according to the method of this U.S. Patent is water-soluble, since not having any crosslinking structure. Therefore, the polymer of the U.S. Patent is definitely different from that of the present invention in both chemical properties and applicable uses.

Further, in each of various ionic polymers which are known as ion exchange resins, a proportion of the crosslinking structure therein is about 10%, at the lowest and it shows no water swell characteristics.

SUMMARY OF THE INVENTION

The present invention relates to a high water-absorptive resin emulsion in which high water-absorptive resin fine particles each having a diameter of 3 $\mu$m or less are dispersed in an oil, and such a high water-absorptive resin emulsion can be prepared by a reversed phase emulsion polymerization of an ionic water-soluble monomer and 0.01 to 0.5 mol% of a divinyl compound in an oil.

The above reversed phase emulsion polymerization is characterized by comprising the steps of first dispersing an aqueous monomer solution in an oil with a surface active agent having of an HLB of 4 to 11, and then polymerization with an oil-soluble radical-generator.

The typical ionic water-soluble monomers used in the present invention include dimethylaminoethyl methacrylate, their quaternary compounds and acrylates, and examples of the divinyl compounds which will be subjected to the copolymerization include methylenebisacrylamide and allylacrylamide.

DESCRIPTION OF THE PREFERRED EMBODIMENTS

An object of the present invention is to provide a novel high water-absorptive resin emulsion in which fine particles comprising a crosslinked ionic polymer are dispersed in an oil.

The smaller the diameter of the high water-absorptive resin particles is, the more stable its dispersion state is. For this reason, the particle diameter should be 3 $\mu$m or less, and it preferably is 1 $\mu$m or less.

The aforesaid dispersion of the fine particles can be obtained by subjecting an aqueous monomer solution to a reversed phase emulsion polymerization.

The above reversed phase emulsion polymerization is characterized by comprising the steps of first dispersing an aqueous monomer solution in an oil with a surface active agent, and polymerization with an oil-soluble radical-generator. In this case, since the polymerization is carried out in a micell, and the polymer can be prepared in the form of the fine particles.

In order to obtain the polymer which is not soluble in water but which swells in water, it is necessary that a crosslinking structure is made in the obtained polymer. And this crosslinking structure can be formed by copolymerizing with a divinyl compound at the time of the polymerization of the ionic water-soluble monomer.

A proportion of the divinyl compound to all the monomers in the copolymerization is preferably within 0.01 to 0.5 mol%, and when the proportion of the divinyl compound is less than 0.01 mol%, the prepared polymer is water-soluble; when it is in excess of 0.5 mol%, a crosslinking density is too high, whereby a swelling ability declines. The typical examples of the divinyl compounds used in the present invention include methylenebisacrylamide, allylacrylamide, ethylene glycol dimethacrylate, and in general, all the divinyl compounds are usable in the present invention, in so far as they can be usually employed in the manufacture of the high water-absorptive resins. Another method by which the crosslinkg structure is given to the polymer comprises reacting a difunctional crosslinking agent with the polymer. The suitable crosslinking agents used for such a purpose are oil-soluble diglycidyl compounds, and their examples include ethylene glycol diglycidyl ether and propylene glycol diglycidyl ether.

The crosslinkage of the polymer can be achieved by first adding the diglycidyl compound to the polymer emulsion prepared by the reversed phase emulsion polymerization, and then heating the resulting mixture at a temperature of 50° to 100° C. for several hours.

The crosslinking reaction using the diglycidyl compound can be utilized so that the water-soluble polymer, by which the divinyl compound is not allowed to copolymerize, may have the crosslinking structure and so that the crosslinking density of the divinyl compound copolymer may be further enhanced.

Swell characteristics are imparted to the high water-absorptive resin by the ionic functional group in the polymer, and this ionic polymer may be obtained by polymerizing ionic monomers.

Examples of the ionic monomers which will be used as raw materials include acrylates, acrylamidomethylpropane sulfonates, salts and quaternary compounds of dimethylaminoethyl(meth)acrylates, salts and quaternary compounds of dimethylaminopropyl(meth)acrylamide and dimethyldiallyl-ammonium salts. Above all, the compounds each having a monovalent counter ion are effective. These ionic monomers can be polymerized alone and can additionally be copolymerized with two or more materials.

Further, acrylamide is a nonionic monomer and its polymer cannot exhibit a high water-absorptive ability, but when the acrylamide is present in an amount equal to or less than that of the ionic monomer in the copolymerization, it does not have a severely adverse influence on the swell characteristics. Another monomer can be employed in the copolymerization on condition that it does not impair the water-absorptive performance.

The high water-absorptive resin composition comprises 50 to 100% by weight of ionic monomers and 0 to 50% by weight of acrylamide. The monomer is used in the form of an 30 to 80 wt% aqueous solution, but a weight ratio of the aqueous monomer solution to the oil is within the range of 3:7 to 7:3. With regard to the oils used in the present invention, animal and vegetable oils can be used, in addition to mineral oils such as hydrocarbons and esters. To sum up, the liquids which are not dissolved in the aqueous monomer solution are all usable.

The surface active agent is employed in an amount of 5 wt% or more based of the weight of the monomer, and an HLB of the surface active agent is suitably within the range of 4 to 11.

Examples of the surface active agents having such an HLB level include sorbitan monooleate, sorbitan monostearate, nonyl phenyl ether ethylene oxide adducts, block copolymers of fatty acid polycondensates and polyhydric alcohols, and they may be used alone or in a combination of two or more thereof. After the polymerization, another surface active agent having a higher HLB may be additionally mixed therewith so as to improve a dispersibility of the oil into water.

Examples of the oil-soluble radical-generator used in the polymerization of the present invention include azobisisobutyronitrile, azobisvaleronitrile, benzoyl peroxide and lauroyl peroxide. This radical-generator is added in an amount of 0.01 to 0.2 wt% based on the weight of the monomer and is subjected to the polymerization at a temperature of 40° to 80° C.

The high water-absorptive resin emulsion which has been obtained by the polymerization may be used in a hydrate state, or alternatively it may be employed after being heated and thereby dehydrated.

The anionic and the cationic high water-absorptive resin emulsions, if in an anhydrous state, can be mixed, and the resulting mixture liquid will take a gel state, when brought into contact with water. Since being liquid, the high water-absorptive resin emulsion according to the present invention can be transported through pipes and involves no trouble by dusts. In short, the product of the present invention can eliminate the drawbacks which is attributable to the fact that the conventional high water-absorptive resin is in the form of a powder. In addition, since the water-absorptive resin takes the morphology of the fine particles, it can be expected that the emulsion comprising such fine particles will be applied to other extensive fields.

Now, the present invention will be described in detail in accordance with examples.

EXAMPLE 1

In a 500-ml three-necked separable flask was placed 72 g of acrylic acid, and 48 g of desalted water was then added thereto and the monomer was dissolved in the water. While stirring was carried out so that an internal temperature therein might be maintained in a range of 40°to 50° C., 45 g (80 mol% to acrylic acid) of granuated KOH was added thereto in order to neutralize the solution. Afterward, 0.36 g of methylenebisacrylamide was added thereto. Further, 80 g of olive oil, 2 g of Span 80 (sorbitan monooleate) and 10 g of B-246 (a block copolymer of a fatty acid polycondensate and a polyhydric alcohol) manufactured by ICI were added thereto and were then mixed with one another. A nitrogen gas was blown into the solution for 1 hour so as to remove dissolved oxygen therefrom, and 0.36 g of a reaction initiator, i.e., V-65 (azobisvaleronitrile) manufactured by Wako Junyaku Co., Ltd. was then added thereto, while the internal temperature was maintained at 40° C., in order to begin a polymerization. After 24 hours, the prepared polymer had a particle diameter of 0.5 μm or less. And this polymer was easily emulsified in an aqueous solution in which New Call 564H (nonylphenolethylene oxide adduct) manufactured by, Nippon Nyukazai Co., Ltd. was contained as much as 1%, so that an emulsion of the olive oil containing a hydrate resin in its oil drops was prepared. The polymer which had been obtained by washing the polymer with acetone had a 300-fold or more water absorbency.

EXAMPLE 2

In a 500-m( three-necked separable flask was placed 58 g of acrylic acid, 14 g of acrylamide and 3.6 ml of a 1% aqueous solution of methylenebisacrylamide, and 67 g of 15% ammonia water was then added thereto with stirring, while cooling was carried out so that an internal temperature therein might be maintained in the range of 40°to 50° C. Then, 100 g of benzyl benzoate and 15 g of B-246 (which was also used in Example 1) were added thereto, and a nitrogen gas was blown into the solution for 1 hour. Afterward, while the internal temperature was maintained at 60° C., 0.36 g of a 1% acetone solution of AIBN (azobisisobutyronitrile) was added thereto in order to commence a polymerization. After 24 hours, 1.4 ml of a 1% benzyl benzoate solution in ethylene glycol diglycidyl ether was added thereto, and a temperature of the solution in the flask was then maintained at 50° C. for 3 hours. A particle diameter of the resulting polymer was 0.5 μm or less. To this polymer were added 1 g of eucalyptus oil and 10 g of New Call 564H (which was also used in Example 1), and 100 g of a 10% aqueous solution of a dimethylamine/epichlorohydrin condensate was mixed therewith in order to obtain a hydrate gel having an aroma.

EXAMPLE 3

Following the same procedure as in Example 1 except that olive oil was replaced with cyclohexane, a polymerization was carried out, thereby preparing a resin emulsion comprising polymer particles of 0.5 μm or less in diameter and having high water-absorptive properties.

A filter paper was coated with the thus prepared emulsion by means of a bar coater, and was then dried in order to obtain the paper having the high water-absorptive resin on the surface thereof.

EXAMPLE 4

In a 500-ml three-necked separable flask was placed 54.9 g of dimethylaminoethyl methacrylate and 15.1 g of acrylic acid, and 48 g of desalted water was then added thereto and monomers were dissolved in the water. While stirring was carried out so that an internal temperature therein might be maintained in a range of 40° to 50° C., 14 g of hydrochloric acid (HCl concentration 35%) was added thereto in order to adjust a pH of the solution to 4.0. Afterward, 0.21 g of methylenebisacrylamide was added thereto. Further, 180 g of kerosene, 13.5 g of Span 85 (sorbitan trioleate) and 13.5 g of Tween 81 (polyoxyethylene sorbitan monooleate) were then added thereto. A nitrogen gas was blown into the solution for 1 hour so as to remove dissolved oxygen therefrom, and while the internal temperature was maintained at 50° C., 0.36 g of benzoyl peroxide was then added thereto in order to begin a polymerization. The resulting polymer had a particle diameter of 0.5 μm or less and its dry solid had a 200-fold or more water absorbency. Moreover, the dry solid absorbed 100-fold or more amount of methanol.

EXAMPLE 5

In a 500-ml three-necked separable flask was placed 68.2 g of a 80% methacryloyloxyethyltrimethyammonium chloride solution and 18.7 g of acrylamide, and 100 g of desalted water was then added thereto and the former compounds were dissolved in the water. A small amount of hydrochloric acid was added thereto in order to adjust a pH of the solution to 4.0. Then, 3 ml of a 1% aqueous methylenebisacrylamide solution was added thereto. Afterward, 180 g of a liquid paraffin, 10 g of B-246 and 10 g of Tween 85 (polyoxyethylene sorbitan trioleate) were added thereto. An internal temperature was adjusted to 50° C., and a nitrogen gas was blown into the solution for 1 hour in order to remove dissolved oxygen therefrom. Next, 0.36 g of AIBN (which was also used in Example 1) was added thereto as a reaction initiator, so that a polymerization was commenced. A temperature of the solution was then elevated up to a level of 100 to 110° C and a gas blow was carried out, so that water was removed from the resulting polymer particles, thereby obtaining a dehydrated cationic resin emulsion which had a high water-absorptivity.

When the polymer dispersion in Example 1 was heated in like manner, a dehydrated anionic resin emulsion having a high water-absorptivity was prepared. and this anionic emulsion was admixed with the above mentioned cationic emulsion in an amount of 10% by weight based on the weight of cationic emulsion. At this time, it was appreciated that the resulting mixed emulsion was stable. Further, even when New Call 564H was dissolved in the mixed emulsion in an amount of 1% by weight based on the weight of the mixed emulsion, the mixed emulsion was also stable. Next, water was further added to the mixed emulsion prepared in this way, and at this time, the latter formed a strong rubbery gel. This result indicates that the above mixed emulsion is effective as a water stopper.

What is claimed is:

1. A composition, comprising:
a highly water-absorptive resin emulsion in which fine particles of a highly water-absorptive resin are dispersed in an oil; said resin comprising a polymer of at least one acrylic ionic water soluble monomer, employed in an amount from 50 to 100% by weight of the total monomer, and acrylamide monomer, employed in an amount from 0 to 50% by weight of the total monomer, and having a crosslinking density of from 0.01 to 0.5 mol % based on total monomers; said fine particles each having a diameter of 3 μm or less.

2. A composition according to claim 1 wherein said polymer comprises crosslinker derived from a crosslinking agent selected from the group consisting of divinyl compounds which copolymerize at the time of polymerization of ionic water-soluble monomer, and difunctional crosslinking agents which react with said polymer after formation of said polymer.

3. A composition according to claim 1, wherein the ionic monomer is selected from salts of diemthylaminoethyl(meth)acrylate, dimethylaminopropyl(meth)acrylamide and quaternary compounds thereof.

4. A composition according to claim 1 wherein as said ionic monomer, a (meth)acryloyloxyethyltrimethylammonium salt is used.

5. A composition according to claim 1 wherein as said ionic monomer, acrylic acid and a dialkylaminoethyl(meth)acrylate are used.

6. A composition according to claim 1 wherein as said ionic monomer, an alkali metal salt or an ammonium salt of acrylic acid is used.

7. A composition comprising:
a mixture of a cationic highly water-absorptive resin emulsion and an anionic highly water-absorptive resin emulsion, wherein each of said resin emulsions comprises:
fine particles of a highly water-absorptive resin dispersed in an oil; said resin comprising a polymer of at least one acrylic ionic water soluble monomer, employed in an amount from 50 to 100% by weight of the total monomer, and having a crosslinking density of from 0.01 to 0.5 mol % based on total monomers; said fine particles each having a diameter of 3 micrometers or less.

* * * * *

UNITED STATES PATENT AND TRADEMARK OFFICE
CERTIFICATE OF CORRECTION

PATENT NO. : 5,070,133
DATED : December 3, 1991
INVENTOR(S) : Tooru Miyajima

It is certified that error appears in the above-identified patent and that said Letters Patent is hereby corrected as shown below:

Column 2, line 5, "15 The present invention relates" should read -- The present invention relates --.

Column 4, line 53, "In a 500-m( three-necked" should read -- In a 500-ml three-necked --.

Signed and Sealed this

Twentieth Day of July, 1993

Attest:

MICHAEL K. KIRK

Attesting Officer

Acting Commissioner of Patents and Trademarks